US007029254B2

(12) United States Patent

Gozu et al.

(10) Patent No.: US 7,029,254 B2
(45) Date of Patent: Apr. 18, 2006

(54) APPARATUS AND METHOD FOR REPAIRING A DAMAGED PORTION IN A TUBULAR MEMBER MADE OF REFRACTORY MATERIAL

(75) Inventors: Keisuke Gozu, Tokyo (JP); Tomoya Tanaka, Tokyo (JP); Katsumi Nonaka, Tokyo (JP)

(73) Assignee: Plibrico Japan Company Ltd., Tokyo (JP)

( * ) Notice: Subject to any disclaimer, the term of this patent is extended or adjusted under 35 U.S.C. 154(b) by 345 days.

(21) Appl. No.: 10/267,577

(22) Filed: Oct. 10, 2002

(65) Prior Publication Data

US 2003/0067087 A1 Apr. 10, 2003

(30) Foreign Application Priority Data

Oct. 10, 2001 (JP) ............................ 2001-312807

(51) Int. Cl.
*B29C 73/00* (2006.01)

(52) U.S. Cl. ....................... 425/11; 156/94; 264/36.15; 264/36.16

(58) Field of Classification Search .................. 425/11; 264/30, 36.15, 36.16; 156/94
See application file for complete search history.

(56) References Cited

U.S. PATENT DOCUMENTS

| | | | | |
|---|---|---|---|---|
| 1,906,557 | A * | 5/1933 | Evans | 264/30 |
| 3,142,868 | A * | 8/1964 | Blount | 425/11 |
| 5,527,169 | A * | 6/1996 | Goldenberg et al. | 425/11 |
| 5,558,882 | A * | 9/1996 | Ulmer | 425/11 |

FOREIGN PATENT DOCUMENTS

| | | | |
|---|---|---|---|
| DE | 21 43 241 | | 3/1972 |
| DE | 36 01 621 | | 3/1987 |
| JP | 06-145737 | A * | 5/1994 |

* cited by examiner

*Primary Examiner*—Duane Smith
*Assistant Examiner*—Emmanuel S. Luk
(74) *Attorney, Agent, or Firm*—Oblon, Spivak, McClelland, Maier & Neustadt, P.C.

(57) ABSTRACT

There are provided a shaft adapted for introduction into a tubular member made of refractory material and an expander provided on a leading edge of the shaft. The expander has both ends provided with a repairing material container and a seat plate. With the repairing material container having monolithic refractory material loaded therein confronted to a damaged portion in an inner wall of the tubular member, the expander is expanded by a driving motor to push the repairing material container toward the damaged portion while pushing the seat plate in contact with a wall surface opposite to the damaged portion in behind. Thus, the monolithic refractory material is filled and deposited in the damaged portion under remote control.

6 Claims, 4 Drawing Sheets

Fig. 4
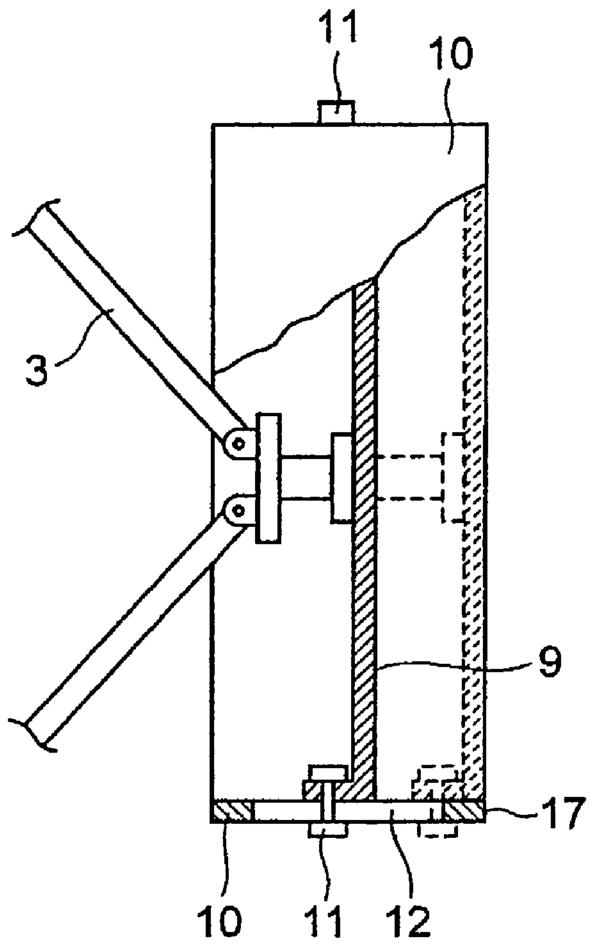
Fig. 5(a)
Fig. 5(b)
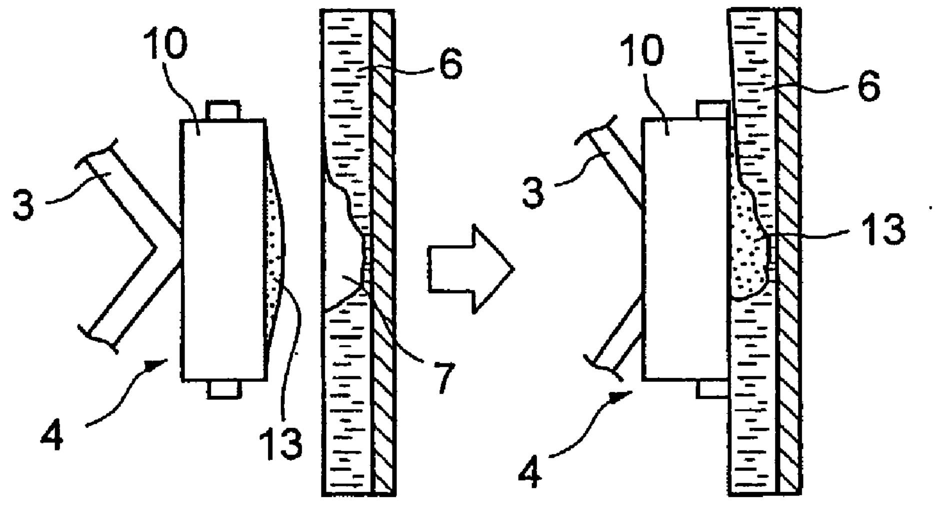

APPARATUS AND METHOD FOR REPAIRING A DAMAGED PORTION IN A TUBULAR MEMBER MADE OF REFRACTORY MATERIAL

The present invention relates to an apparatus and a method for repairing a damaged portion in a tubular member made of refractory material, in particular an apparatus and a method for repairing a damaged portion at a narrow portion by use of monolithic refractory material, the narrow portion being a portion of a furnace wall made of refractory material, where no person can directly enter a tubular system or structure with the damaged portion to carry out repairing operation.

In many cases, a damaged portion of a furnace wall made of refractory material have been repaired by a method wherein a person enters in a tubular system with the damaged portion, dismantles a portion of the furnace wall at the damaged portion and restores the dismantled portion by use of refractory material. When the damage of the furnace wall is minor, the damaged portion of the furnace wall has been repaired by applying monolithic refractory material to the damaged portion of the furnace wall (by, e.g., coating, filling and spraying).

A tubular member, such as the dipleg of a cyclone, where no person can enter a tubular system to directly carry out required operation, can be built in by applying refractory material to tube sections divided in lengths and having a small diameter on the ground, and coupling and assembling the tube sections with the refractory material applied thereto for new construction. After service operation for several years, the refractory material can be partly worn or dropped off, forming a damaged portion. There has been proposed no effective method for repairing the damaged portion since the tubular system with the damaged portion or the damaged portion is not accessible. The entire tubular system with refractory material applied thereto has been usually exchanged for a new tubular system.

When the damaged portion of a furnace wall having a small tube diameter and made of refractory material is repaired, not only it is uneconomical to exchange the entire tubular system for a new tubular system whenever the refractory material in the tubular member is damaged, as stated earlier, but also it takes a great deal of labor for exchange. Although there is a method for newly applying refractory material to an outer side of a tubular member with the damaged portion to solve the problem, this method creates, e.g., a problem that the mass of the tubular member increases to need a support for the tubular member after repair.

When an attempt is made to spray monolithic refractory material to the damaged portion by use of a long nozzle for repair, accurate application of the monolithic refractory material is difficult since the inner surface to be applied is difficult to see. The method is not practical since there is a possibility that the tubular member is clogged by formation of an uneven repaired surface or an oversprayed surface at the damage portion.

It is an object to provide a repairing technique capable of remotely manipulating a repairing apparatus to reliably repair a damage portion made of refractory material in a tubular member having a small diameter by filling monolithic refractory material with or coating monolithic refractory material on the damaged portion just as a person directly carries out the repairing operation in the tubular system.

In order to attain the object, the present invention provides an apparatus for repairing a damaged portion of a tubular member made of refractory material, characterized in that the apparatus comprises a shaft adapted for introduction in a tubular member made of refractory material, an expander provided on a leading edge of the shaft, a repairing material container adapted for loading monolithic refractory material therein; a seat plate adapted for pushing the repairing material container from behind during repairing operation, a driving motor for remotely expanding and contracting the expander; and the repairing material container and the seat plate being provided so as to be moved toward or away from an inner wall of the tubular member by expanding and contracting the expander, whereby the monolithic refractory material loaded in the repairing material container is deposited into a damaged portion of the tubular member by expanding the expander to press the repairing material container with the monolithic refractory material loaded therein against the damaged portion.

The present invention also provides a method for repairing a damaged portion of a tubular member made of refractory material, characterized in that the method comprises introducing a repairing apparatus having a leading end provided with a repairing material container with monolithic refractory material loaded therein and positioning the repairing material container at a location of a damaged portion, and pushing the repairing material container toward the damaged portion by use of the expander under remote control to deposit the monolithic refractory material in the damaged portion.

The tubular member made of refractory material, which the present invention is applied to, is a tubular member, which has a furnace wall having an inner side made of refractory material, and which has too small an inner diameter for a person to enter directly therein for repairing operation. The present invention is applicable to that sort of tubular member or a tubular system or structure including that sort of tubular member.

The tubular member may be formed in a circular or rectangular shape or a shape similar thereto in section. It is preferable that the tubular member has an inner diameter in a range from about 100 mm to about 600 mm. It is more preferable that the tubular member has an inner diameter in a range from about 200 mm to about 600 mm. The reason is that when the inner diameter is smaller than 100 mm, the introduction of the repairing apparatus becomes difficult, and that when the inner diameter is greater than 600 mm, the repairing apparatus according to the present invention becomes unnecessary since a person can enter the tubular member for repairing operation. When the tubular member is not circular in section, the inner diameter means the minimum dimension of an opening in section.

As the repairing material used in the present invention is preferably used repairing material made of monolithic refractory material, which can be used as repairing material for a damaged portion made of refractory material to repair the damaged portion in simple and reliable fashion. As long as the repairing material is made of monolithic refractory material, any type of repairing material conventionally used or available in the future can be widely applicable. The repairing material may be properly selected, depending on the refractory material forming the tubular member or the application of the tubular member. Examples of the repairing material are one containing alumina, silica and magnesia as main components, and one containing alumina, silica and lime as main components.

When that sort of repairing material is used, repairing material made of powdery monolithic refractory material is changed into plastic material so as to have a proper viscosity suited to repairing operation by adding water to the repairing material. When the plastic material has too high a fluidity, the plastic material that has been deposited in the damaged portion flows downward, not only failing to maintain a required shape but also degrading the operability in repairing operation.

When the plastic material has too low a fluidity, the plastic material becomes difficult to deposit in the damaged portion because of collapse etc.

In drawings:

FIG. 4 is a front view, partly cutaway, of the repairing material container shown in FIG. 2;

Figure 6:
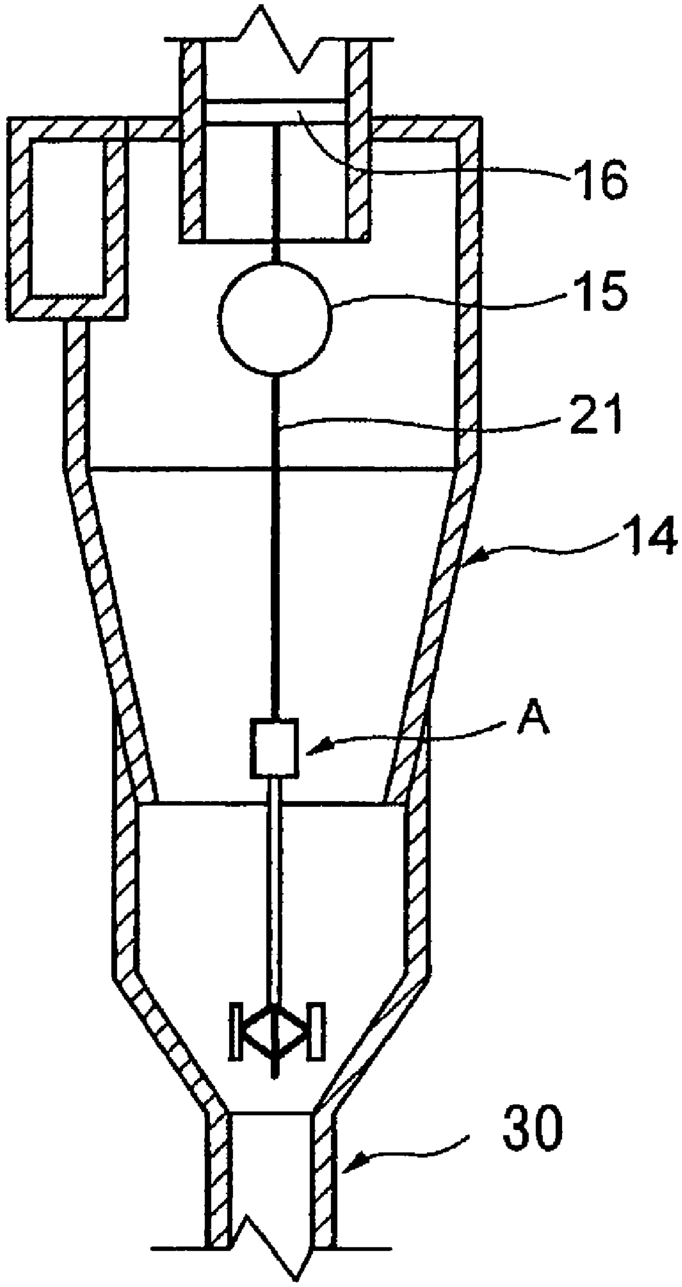

FIGS. 5(*a*) and 5(*b*) are schematic views of an example of the repairing method according to the present invention, FIG. 5(*a*) being a schematic view showing a state before the repairing material container is pushed toward a damaged portion, and FIG. 5(*b*) being a schematic view of a state after monolithic refractory material has been filled in the damaged portion; and FIG. 6 is a sectional view of an example of the application of the present invention (to a cyclone).

Now, the present invention will be described in detail in reference to the accompanying drawings.

Figure 1:
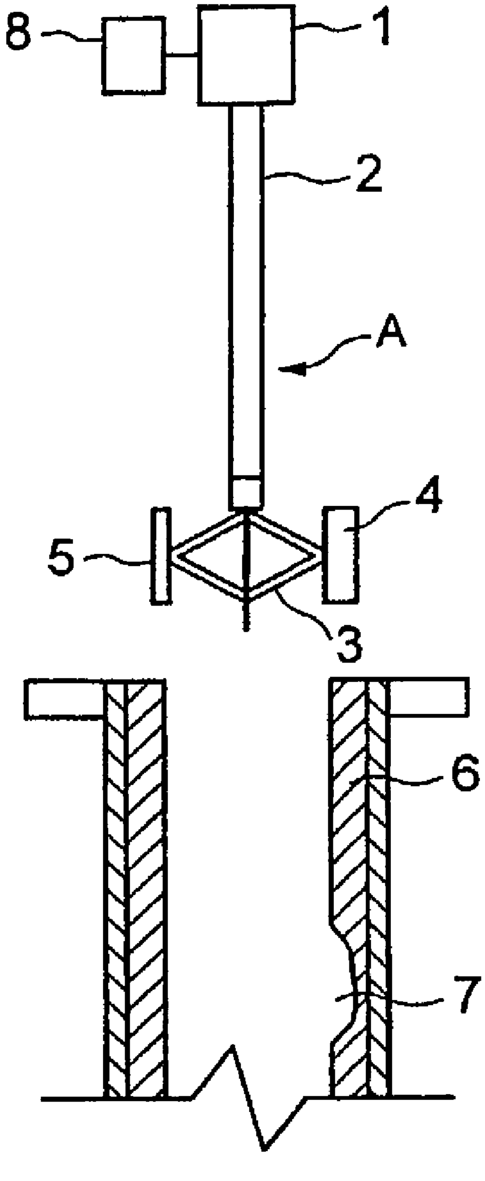
FIG. 1 is a schematic front view of the repairing apparatus according to an embodiment of the present invention.

FIG. 1 schematically shows an embodiment of the repairing apparatus A according to the present invention, which uses monolithic refractory material to repair a damaged portion 7 at a tubular member made of refractory material 6. The repairing apparatus A has a leading edge of a shaft 2 provided with an expander 3, which includes a repairing material container 4 and a seat plate 5.

The shaft 2 has an end remote from the expander 3, i.e., a manipulating side, provided with a driving motor 1. By controlling the driving motor 1 through a control panel 8, the expander 3 can be remotely expanded and contracted to move the repairing material container 4 and the seat plate 5 toward or away from an inner wall of the tubular member. Although the driving motor is, as a rule, an electric motor, the driving motor may be another driving source.

The shaft 2 has a power transmission member, such as a rotary shaft, passing therethrough, though not shown. The power from the driving motor 1 is transmitted to the expander 3 through the rotary shaft in the shown embodiment. The shaft 2 plays a role to convey the repairing material container 4 toward the damaged portion 7 of the tubular member 6 and serves as a power transmission for coupling the expander 3 with the driving motor 1 to drive the expander. Although the shaft 2 is preferably a straight bar-shaped member in terms of controllability of the repairing apparatus A and operability during repair, the shaft may be flexible, depending on the shape of the tubular member 6 or operating conditions.

The expander 3 may be of a jack type or cylinder type besides a pantograph type shown as the embodiment in FIG. 1. The pantograph type is lightweight because of a relatively simple system and is advantage in terms of operability.

In the shown embodiment, the expander 3 has one operating end provided with the repairing material container 4 and the other operating end provided with the seat plate 5. Thus, the repairing material container 4 and the seat plate 5 confront each other with the expander 3 interposed therebetween. When the expander 3 is expanded by the driving motor 2, both operating ends of the expander symmetrically move. The moving speeds and the moving distances of both operating ends can be controlled by the driving motor 1.

The seat plate 5 serves to push the repairing material container 4 from behind it during repairing operation. Specifically speaking, when the seat plate 5 is positioned behind the repairing material container 4 with the expander 3 interposed between the seat plate and the repairing material container, and when the seat plate presses a wall surface confronting the damaged portion 7, a force is applied toward the damaged portion to support the repairing material container 4 from behind to push the repairing material container toward the damaged portion 7. In order that the seat plate 5 gets in stable contact with the wall surface to constantly apply the force to the repairing material container 4 from right behind it, the seat plate has a certain required size. The size of the seat plate is mainly determined by the inner diameter of the tubular member 6. It is preferable that the contacting portion of the seat plate 5 is formed in a shape similar to the wall surface of the tubular member 6. For example, when the wall surface is flat, the contacting portion is formed in a flat shape. When the tubular member is cylindrical, the contacting portion is formed in an arched shape, which has substantially the same curvature as the tubular member.

Figure 2:
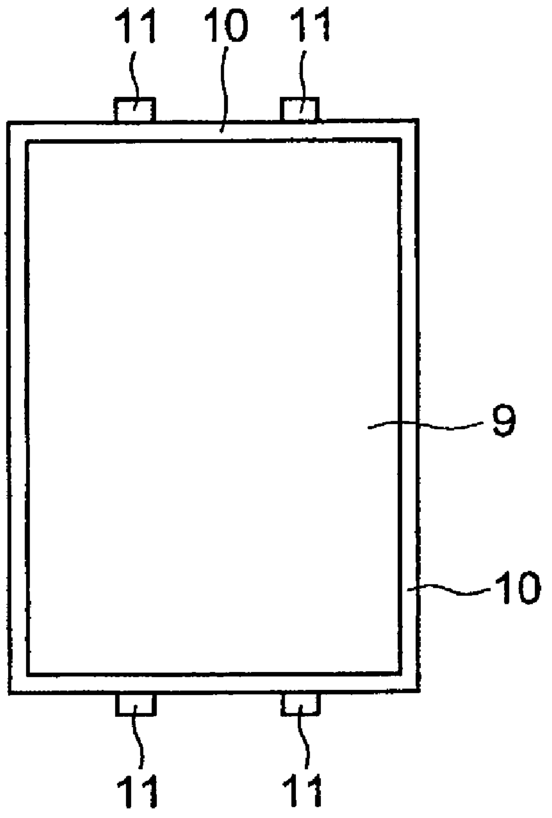
FIG. 2 is a right side view of a repairing material container in the repairing apparatus shown in FIG. 1.
Figure 3:
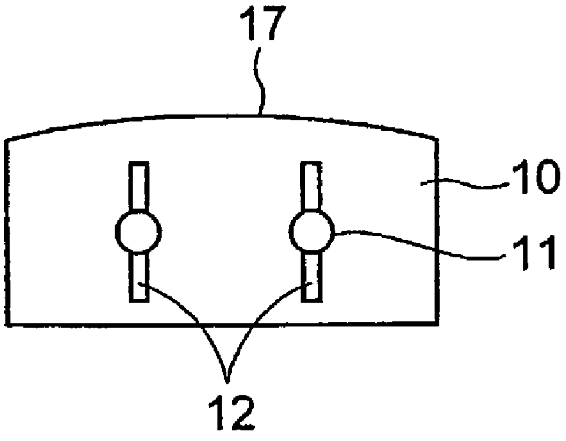
FIG. 3 is a bottom view of the repairing material container shown in FIG. 2.

Now, the repairing material container 4 will be explained in reference to FIG. 2, FIG. 3 and FIG. 4. FIG. 2 is a right side view of the repairing material container seen from an open end side (a right side in FIG. 1), FIG. 3 is a bottom view of the repairing material container seen from a lower side of the sheet showing FIG. 2 (a bottom side in FIG. 1), and FIG. 4 is a left side view of the repairing material container, partly in section, seen from a left side of the sheet showing FIG. 2 (a front side in FIG. 1). As shown in these figures, the repairing material container 4 is a rectangular container, which is essentially composed of a repairing material pressing surface 9 and an extrusion preventing plate 10 provided around an outer peripheral edge of the repairing material pressing surface 9. The repairing material pressing surface 9 is provided on the expander 3 to form a bottom of the container as shown in FIG. 4.

The repairing material pressing surface 9 is slidably fitted in the extrusion preventing plate 10. Specifically speaking, the extrusion preventing plate 10 has, e.g., two slots 12 formed side by side in upper and lower portions as shown in FIG. 3, and the repairing material pressing surface 9 is loosely screwed with respect the slots by bolt and nut fasteners 11. This arrangement allows the repairing material pressing surface 9 to relatively slide, being guided by the slots, upon application of a force beyond a critical level, though the repairing material pressing surface 9 and the extrusion preventing plate 10 are normally located at set positions because of fastening resistance. The dashed line in FIG. 4 shows a state wherein the repairing material pressing surface 9, which has been located at a substantially central position of the extrusion preventing plate 10, is fully pushed out by the expander 3. In that manner, the repairing material pressing surface 9 and the extrusion preventing plate 10 can be relatively moved within the length range of the slots 12.

In this case, at which position of the extrusion preventing plate 10 the repairing material pressing surface 9 is originally set is, as a rule, determined by the depth (thickness) of the damaged portion 7 of the tubular member 6. When the damaged portion 7 is deep and needs a large amount of repairing material 13, the repairing material pressing surface 9 is originally set at a position closer to the left edge in FIG. 4. When the damaged portion 7 is shallow, the repairing material pressing surface 9 is originally set at a position closer to the right edge in FIG. 4. When the depth of the damaged portion 7 is known, it is preferable that the extrusion preventing plate 10 is originally set so as to project from the repairing material pressing surface 9 in an outward direction (at a position closer to the right edge in FIG. 4) by a length corresponding to the known depth.

In a preferred embodiment of the present invention, the repairing material container 4 is formed in a shape to substantially fit to the inner wall surface. Specifically speaking, the leading edges of the extrusion preventing plate 10 of the repairing material container 4 (the upper and lower portions of the extrusion preventing plate), more precisely, contacting edges 17 of the extrusion preventing plate with a tubular inner wall surface, and the repairing material pressing surface 9 are formed in substantially the same shape as the inner wall surface of the tubular member 6. For example, when the inner wall surface of the tubular member 6 is flat, the contacting edges and the repairing material pressing surface are flat. When the inner wall surface of the tubular member 6 is a curved surface, the contacting edges and the repairing material pressing surface are formed as curved surfaces having substantially the same curvature as the inner wall surface. In FIG. 3, the contacting edges 17 are formed so as to substantially fit to the curvature of the cylindrical surface of the tubular member 6.

When the contacting edges 17 of the extrusion preventing plate 10 is formed in substantially the same shape as the inner wall surface of the tubular member 6, the following advantages are offered. A first one is that when the repairing material container 4 is pushed toward the damaged portion 7 for repairing operation, the entire extrusion preventing plate 10 can get in contact with the inner wall surface to fully prevent the repairing material 13 from extruding out of the repairing material container. For example, when the extrusion preventing plate 10 is gotten in contact with a cylindrical wall surface in the case wherein the contacting edges 17 are flat, not arched as shown in FIG. 3, a gap is created between the contacting edges and the wall surface, allowing the repairing material 13 to extrude out of the repairing material container. When the contacting edges are formed in a shape to fit to the wall surface, no gap is created, preventing the repairing material 13 from extruding out of the repairing material container. Another one is that when the repairing apparatus is lifted in a state wherein the repairing material container 4 and the seat plate 5 are put in slightly floating fashion by slightly contracting the expander 3 after having filled the repairing material 13 into the damaged portion 7 of the tubular member 6, the extrusion preventing plate 10 can scrape an excessive portion of the repairing material 13 deposited at the damaged portion 7 to shape the repaired surface into a desired form.

When the repairing material pressing surface 9 is fitted to the shape of the inner wall surface of the tubular member 6, it is easy to load the repairing material 13 into the repairing material container 4 by a thickness according to the depth of the damaged portion 7. Additionally, it is possible not only to prevent the repairing material 13 from being excessively loaded into the repairing material container but also to shape the repaired surface into a desired form by pressing the repairing material pressing surface 9 against the repaired surface after deposition. In particular, it is possible to shape the repaired surface into a more desired form by pressing the repairing material pressing surface 9 against the repaired surface after having carried out the scraping by the extrusion preventing plate 10.

Although the repairing material container 4 and the seat plate 5 are, as a rule, provided on the expander 3 as in this embodiment, the seat plate 5 may be provided on the shaft 2, the expander 3 may be located between the shaft 2 and the repairing material container 4, or only the seat plate 5 may be provided on the expander 3 for instance.

Though not shown, a light or a fiberscope is, as a rule, provided on the leading edge of the shaft 2 or in the vicinity of the repairing material container 4. It is important that the repairing material container 4 is accurately set at the damaged portion 7. When the positioning of the repairing material container 4 at the damaged portion is visually checked from the manipulating position, the light can be of use. When the positioning of the repairing material container 4 at the damaged portion cannot be visually checked from the manipulating position, the fiberscope is utilized to make checking of the positioning. The light or the fiberscope is helpful when it is checked to what degree or in what state the repaired surface has been shaped after having deposited the repairing material 13 in the damaged portion 7.

Although it has been stated that the size of the seat plate 5 is varied according to the inner diameter of the tubular member 6, the size of the expander 3 and the repairing material container 4 may be properly varied according to the inner diameter of the tubular member 6. Although the repairing material container 4 is, as a rule, formed in a rectangular shape, the repairing material container may be formed in a circular or elliptical shape, depending on the shape of the damaged portion 7.

Now, referring to FIG. 1, it will be explained how to use the repairing apparatus A according to the present invention in order to repair the damaged portion 7 at the tubular member 6.

First, the damaged portion 7 of the tubular member made of refractory material 6 is cleaned up by air etc. as a preliminary preparation. Then, under control through the control panel 8 for the driving motor 1 of the repairing apparatus A, the expander 3 is contracted in a size to be able to accommodate the repairing material container 4 and the seat plate 5 into the tubular member to be repaired. Next, the repairing material (monolithic refractory material) 13 is loaded into the repairing material container 4 at the manipulating position outside the tubular member. At that time, the extrusion preventing plate 10 is located at a position to project outside from the repairing material pressing surface 9 of the repairing material container 4 (at a position closer to the damaged portion in the tubular member) according to the depth of the damaged portion 7 of the tubular member 6 in order to load the repairing material 13 into the container by a proper amount so that the damaged portion can be sufficiently filled with the repairing material.

After that, the shaft 2 is introduced into the tubular member, and the repairing apparatus A is moved to position the repairing material container 4 at the damaged portion 7. At this case, when the positioning of the repairing material container 4 with respect to the damaged portion 7 can be visually checked from the manipulating position, the positioning is visually checked. When the positioning cannot be visually checked from the manipulating position, the positioning is checked through the fiberscope etc. FIG. 5(*a*) shows a state wherein the repairing material container 4 with the repairing material 13 loaded therein has been positioned so as to confront the damaged portion 7 of the tubular member 6.

When the repairing material container 4 has been positioned at the location of the damaged portion 7, the repairing material 13 loaded in the repairing material container 4 is pressed against and deposited in the damaged portion 7 by expanding the expander 3 under control through the control panel 8 for the driving motor 1. At this time, a force is applied to press the repairing material pressing surface 9 toward the damaged portion since the seat plate 5 gets in contact with a wall surface opposite to the damaged portion at almost the same time as the extrusion preventing plate 10 of the repairing material container 4 gets in contact with the wall surface around the damaged portion. When the expander 3 is further expanded, the repairing material pressing surface 9 is slid toward the damaged portion to press the repairing material 13 into the damaged portion to the depth. At this time, the extrusion preventing plate 10 prevents the repairing material 13 from being extruded out of the container. FIG. 5(*b*) shows a state wherein the repairing material pressing surface 9 has been fully pushed out to fill the repairing material 13 into the damaged portion 7.

After the repairing material 13 is pressed against the damaged portion 7 to be filled thereinto, the expander 13 is slightly contracted by the driving motor 1 to put the repairing material container 4 and the seat plate 5 into in slightly floating fashion with respect to the wall surface. When the repairing apparatus A is lifted with the repairing material container 4 and the seat plate 5 slightly floated from the wall surface, the contacting edges 17 of the extrusion preventing plate 10 with the tubular inner wall surface scrapes an excessive portion of the repairing material 13 deposited at the damaged portion 7 to shape the repaired surface into a desired form.

After an excessive portion of the repairing material 13, which has adhered to the repairing material container 4, is removed, the repairing apparatus A is lowered again, the expander 3 is expanded to press the repairing material pressing surface 9 of the repairing material container 4 against the repaired surface or to press the seat plate 5 against the repaired surface after having rotated the repairing apparatus A one half revolution. By this operation, the adhesiveness of the repairing material 13 to the damaged portion 7 can be further improved. When the size of the repairing material pressing surface 9 and the seat plate 5 is smaller than the size of the tubular member 6, e.g., when the radius of curvature of the repairing material pressing surface and the seat plate is smaller than the radius of curvature of the tubular member 6 in a case wherein the tubular member 6 is cylindrical, the pressing force becomes greater.

FIG. 6 shows an embodiment of the repairing method, which is carried out at an actual furnace by the repairing apparatus A according to the present invention. Specifically speaking, the embodiment shows that the repairing method according to the present invention is utilized when the refractory material of a dipleg 30 provided at a lower portion of a furnace called a cyclone 14. The repairing apparatus A is provided above the dipleg, being suspended by, e.g., a wire 21, preferably through a balancer 15. Reference numeral 16 designates a support for fixing the balancer 15 in the furnace, which is, e.g., a pipe support.

How the repairing apparatus A is supported during repairing operation is properly determined, depending on the size or the form of a tubular member 6 to repair, on the size or the form of the tubular system or structure including the tubular member 6, or on operating conditions. When the tubular system including the tubular member is one extending vertically, the repairing apparatus A is preferably suspended. This is because the repairing apparatus can be vertically or laterally moved in easier fashion, and because the repairing apparatus can be carried to and away from a repaired portion or be positionally controlled in a lateral direction in easier fashion. The repairing apparatus can be more easily moved in the vertical direction by use of the balancer 5.

In order to actually repair the damaged portion 7 of the dipleg 30 in the shown embodiment, an operator lowers the repairing apparatus A, checking the level of the repairing apparatus at a location in the vicinity of an upper end of the cyclone 14, and puts the repairing material container 4 of the repairing apparatus A in alignment with the position of the damaged portion 7 in the first place. Next, the repairing material 13 loaded in the repairing material container is filled and deposited in the damaged portion 7.

The present invention has been described in reference to the shown embodiment. The repairing apparatus A and the repairing method according to the present invention may be modified within a range where the object of the present invention can be attained. The shape of the tubular member 6, how to position the repairing apparatus A and another factor are not limited to the ones shown in the embodiment. For example, when the tubular member 6 extends in a lateral direction, the repairing apparatus A is utilized, being laid in the lateral direction.

Now, in order to describe the present invention more specifically, there will be shown examples, wherein tubular members 6 having a damaged portion 7 in rectangular parallelepiped form in an inner wall surface were used, and the tubular members had had the damaged portion 7 repaired as model experiments.

EXAMPLES

Each of the tubular members 6 was made of refractory material inside an acrylic pipe. The damaged portion 7 was artificially formed in a rectangular parallelepiped shape at a portion of the tubular inner wall of each of the tubular members. The repairing material 13 was filled in the damaged portion 7 of each of the tubular members by using the repairing apparatus A shown in FIG. 1. Then, the repaired surface of the filled repairing material 13 was shaped by use of the repairing apparatus A, and the results after repairing operation was evaluated. In the examples, the inner diameters of the tubular members 6 were modified in a range from 50 mm to 600 mm, and the respective tubular members 6 were evaluated by ○ (very good), Δ (fairly good) and X (bad) with respect to operability, filling degree and surface finish. The surface finish was observed by the naked eyes. The evaluation results are shown in Table 1. In Table 1, the quality of repairing operation was determined by making comprehensive evaluation as to whether the damaged portions were properly repaired.

As the repairing material 13 was used phosphoric acid-bonded refractory material (composition: 90 percent by mass of $Al_2O_3$ and 1.5 percent by mass of $SiO_2$). The damaged portions 7 were formed in a rectangular parallelepiped shape that had an opening having a width of 50 mm, a length of 100 mm and a depth of 19 mm. The sizes of the expander 3, the repairing material container 4 and the seat plate 5 of the repairing apparatus A were modified, depending on the inner diameters of the tubular members 6.

TABLE 1

| | Inner diameter of tubular member (mm) | | | | | | |
|---|---|---|---|---|---|---|---|
| | 50 | 100 | 200 | 300 | 400 | 500 | 600 |
| Operability | X | ○ | ○ | ○ | ○ | ○ | ○ |
| Filling degree | X | ○ | ○ | ○ | ○ | ○ | ○ |
| Surface finish | X | Δ | ○ | ○ | ○ | ○ | ○ |
| Quality of repairing operation | X | ○ | ○ | ○ | ○ | ○ | ○ |

Table 1 shows that the repairing apparatus A according to the present invention can be used, with good operability, with respect to the tubular members 6 having an inner diameter in a range from 100 mm to 600 mm, and that the repairing operation can be provided in good fashion with respect to these tubular members. It was assured that the repairing apparatus A according to the present invention is unnecessary for tubular members 6 having an inner diameter of not shorter than 700 mm since a person can enter in these tubular members to carry out required repairing operation therein.

In accordance with the present invention, the repairing apparatus can be remotely manipulated to repair a damaged portion formed at an inner wall of a tubular member made of refractory material, thereby carrying out the repairing operation by use of monolithic refractory material in easy and reliable fashion even when the tubular member has the damaged portion formed at a narrow position where no person can directly enter to carry out the repairing operation. In other words, the present invention can offer the following advantages:

1) A narrow portion that is not accessible can be repaired by patchwork or coating work as a person directly carries out the repairing operation.

2) The repairing operation can be carried out in economical fashion since monolithic refractory material can be loaded in the repairing material container by an amount according to the size, the depth and the shape of a damaged portion.

3) The service life of a tubular member can be lengthened by repairing, though a damaged tubular member has been exchanged for a new one because of difficulty in repairing.

4) A damage portion can be repaired so as to have a good repaired surface having high strength and excellent properties since the damaged portion can be reliably filled with monolithic refractory material and since the damaged portion can be formed so as to have a surface shaped in a desired form.

The entire disclosure of Japanese Patent Application No. 2001-312807 filed on Oct. 10, 2001 including specification, claims, drawings and summary is incorporated herein by reference in its entirety.

What is claimed is:

1. An apparatus for repairing a damaged portion of a tubular member made of refractory material, comprising:

a shaft adapted for introduction in a tubular member made of refractory material;

an expander mounted to the shaft adjacent a leading end of the shaft;

a repairing material container supported by the expander and adapted for loading monolithic refractory material therein;

a seat plate supported by the expander and adapted for pushing the repairing material container from behind via expansion of the expander during a repairing operation; and a driving motor for remotely expanding and contracting the expander.

2. An apparatus for repairing a damaged portion of a tubular member made of refractory material, comprising:

a shaft adapted for introduction in a tubular member made of refractory material;

an expander provided adjacent a leading end of the shaft;

a repairing material container supported by the expander and adapted for loading monolithic refractory material therein;

a seat plate supported by the expander and adapted for pushing the repairing material container from behind via expansion of the expander during a repairing operation; and a driving motor for remotely expanding and contracting the expander, wherein the repairing material container includes a repairing material pressing surface and an extrusion preventing plate, both being fixed on the expander; and the extrusion preventing plate is provided so as to be capable of sliding the repairing material pressing surface toward the damaged portion by the expander.

3. The apparatus according to claim 2, wherein the extrusion preventing plate of the repairing material container has a contacting portion with a tubular inner wall formed in a shape similar to an inner shape of the tubular member.

4. The apparatus according to claim 1, wherein the leading edge of the shaft is provided with a light and/or a fiberscope to check a location of the damaged portion.

5. The apparatus according to claim 2, wherein the leading edge of the shaft is provided with a light and/or a fiberscope to check a location of the damaged portion.

6. The apparatus according to claim 3, wherein the leading edge of the shaft is provided with a light and/or a fiberscope to check a location of the damaged portion.

* * * * *